Oct. 30, 1962        G. R. RILEY        3,060,745
EMBOSSED PRESSURE RESPONSIVE TUBE
Filed April 14, 1959        2 Sheets-Sheet 1
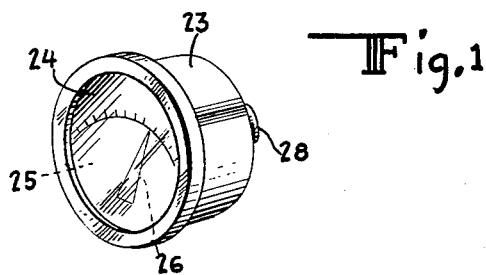
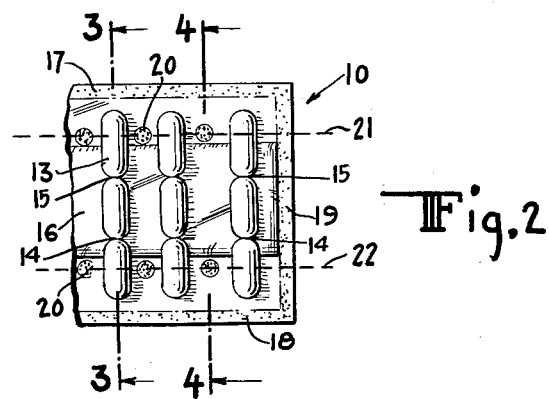
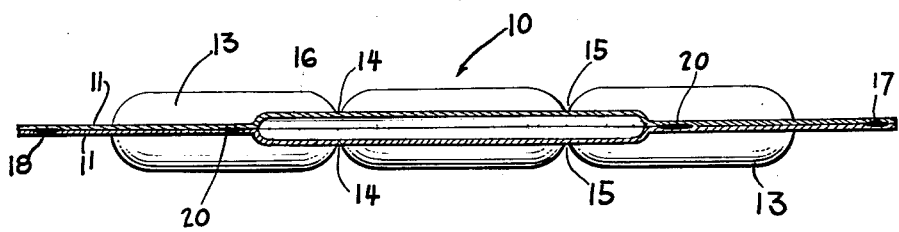
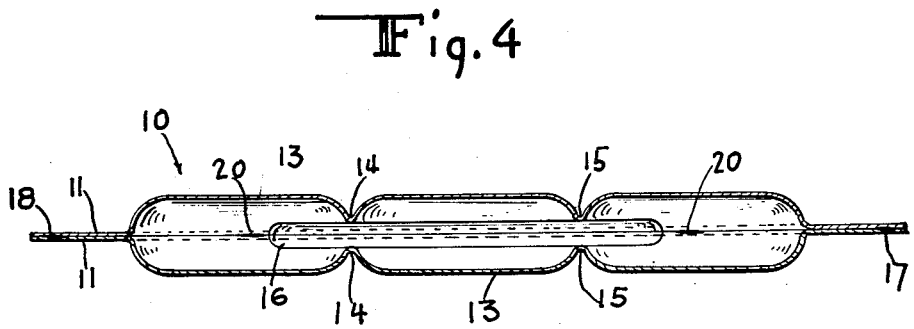
INVENTOR
GEORGE R. RILEY
BY
ATTORNEYS

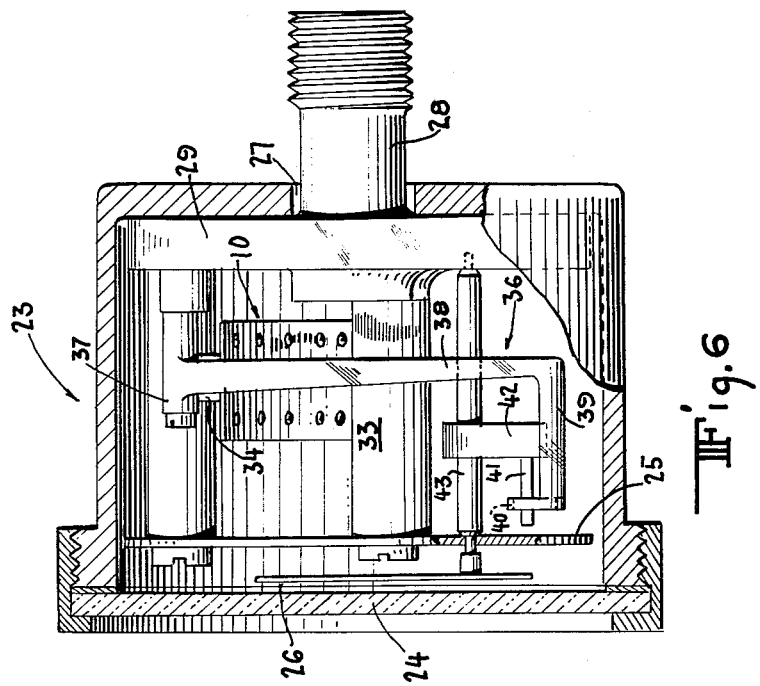
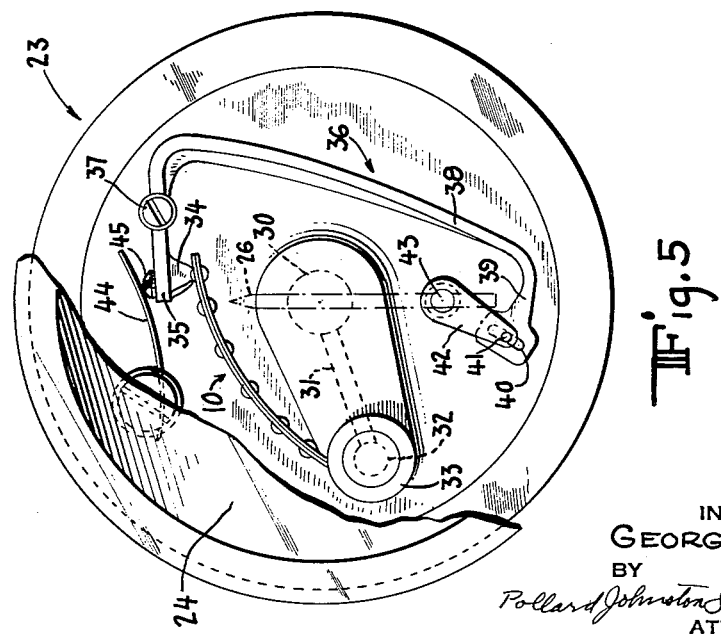

United States Patent Office 3,060,745
Patented Oct. 30, 1962

3,060,745
EMBOSSED PRESSURE RESPONSIVE TUBE
George R. Riley, Grove City, Ohio, assignor to Ametek Inc., Sellersville, Del., a corporation of Delaware
Filed Apr. 14, 1959, Ser. No. 806,320
5 Claims. (Cl. 73—418)

This invention relates to pressure gauges, and particularly to a pressure responsive element for a small pressure gauge.

Very small pressure gauges find utility in many environments, for example on aircraft fire extinguishers. These gauges must have a high degree of accuracy and a relatively large pressure indicating range, and must be relatively inexpensive. In utilizing conventional Bourdon for use with a small gauge of this type, it has been found that if the tube is made of a material heavy enough to withstand the desired pressure, for example 300 p.s.i., the tube does not have enough tip motion to drive the gauge movement through its complete range. On the other hand, if the tubes were made of thinner materials so as to result in the proper tip movement they would take a permanent set far below the desired maximum pressure. It has been unexpectedly found that with the novel Bourdon tube of the invention the above problem was solved by increasing the strength of the tube against internal pressure without any increase in spring rate.

It is an object of this invention to provide a flat tubular pressure responsive element having maximum deflection characteristics for a predetermined strength value determined by the maximum pressure to which it is to be subjected.

It is another object of this invention to provide a flat tubular pressure responsive element having a plurality of spaced transversely extending embossments relieved at predetermined locations therealong to provide points of minimum stress so that the element will have maximum deflection characteristics for a predetermined strength requirement.

It is another object of this invention to provide a flat tubular pressure responsive element having a plurality of spaced transversely extending embossments in which the sides of the element are secured together intermittently between the embossments along two laterally spaced lines.

It is still another object of this invention to provides a flat tubular pressure responsive element having a plurality of spaced transversely extending embossments and a continuous longitudinally extending embossment adjacent the longitudinal center line of the element.

In accordance with one aspect of the invention, the pressure responsive actuating element includes an elongated flat tube having a plurality of spaced transversely extending embossments on its flat sides. The flat sides of the tube are secured together intermittently between the embossments along two transversely spaced longitudinal lines spaced from the side edges of the tube.

According to a further aspect of the invention, the tube is formed of a pair of elongated transversely embossed strips which are secured together intermittently along lines spaced from the side edges and are also secured together along two transversely spaced longitudinal seams.

According to a further aspect of the invention, the two flat sides of the tube have a continuous longitudinal embossment adjacent its center.

According to a still further aspect of the invention, the pressure responsive actuating element includes an elongated flat tube having a plurality of spaced transversely extending embossments which are relieved at predetermined locations therealong to provide spaced points of minimum stress. Such an actuating element will have maximum deflection characteristics for a given strength requirement.

These and other objects, features and advantages of the invention will become apparent from the following detailed description and drawings which are merely exemplary.

In the drawings:

FIG. 1 is a perspective view of one type of small pressure gauge with which the improved Bourdon tube of the invention may be used;

FIG. 2 is a plan view of one end of the improved Bourdon tube of the invention;

FIG. 3 is a cross-sectional view of the tube shown in FIG. 2, taken along the line 3—3 of FIG. 2 looking in the direction of the arrows;

FIG. 4 is a cross-sectional view of the tube shown in FIG. 2, taken along the line 4—4 of FIG. 2 looking in the direction of the arrows, FIG. 5 is a front elevational view, with parts broken away, of the pressure gauge of FIG. 1; and FIG. 6 is a side elevational view, with parts broken away, of the pressure gauge of FIGS. 1 and 5.

FIGS. 2 to 4, inclusive, are directed to the Bourdon tube 10 of the invention. This tube is preferably formed from two thin flat metal strips or sheets 11, which are on the order of 0.003 inch in thickness. Each of the sheets is transversely embossed, as at 13, along a plurality of spaced transverse lines. The spacing between the transverse embossments is preferably uniform so that the tube 10 has uniform strength characteristics along its entire length. In order to further enhance the operating characteristics of the tube, the embossments 13 are preferably relieved at predetermined points 14 and 15 to provide areas of minimum or zero stress.

Each of the sheets 11 is also embossed adjacent its longitudinal center line as by a continuous longitudinally extending embossment 16. Embossment 16 is not as pronounced as the transversely extending embossments 13, as best seen in FIGS. 3 and 4, so that embossment 16 is, in effect, intermitently embossed by embossments 13.

In order to form the Bourdon tube 10 from a pair of sheets 11, the two sheets 11 are placed one upon the other with the embossments 13, the embossments 16, and the points of relief 14 and 15 in corresponding alignment and with the embossments on each sheet facing outwardly away from the other sheet. The sheets 11 are then seam welded along the edges as at 17 and 18 and are seam welded at one end as at 19, so as to form a tube closed at one end. In order to further enhance the strength of tube 10 against internal pressure without materially affecting the spring rate thereof, the two sheets 11 which form the tube 10 are secured together intermittently at 20, as by spot welding, along two transversely spaced longitudinal lines 21 and 22 located inwardly from the side edges. The points of securement 20 are located between adjacent transverse embossments 13 and outwardly of the side edges of longitudinal embossment 16. It is apparent that the tube 10 could also be made out of a single sheet of metal either formed as a seamless tube or bent over itself and sealed along one seam.

When compared to a non-embossed tube made of the same material having the same thickness, the tube of the invention displayed a resistance to internal pressure on the order of 400% greater than the plain tube; whereas, when compared to such a non-embossed tube having the same resistance to internal pressure, the tube of the invention showed a gain of approximately 66% in deflection characteristics. Thus, the Bourdon tube of the invention results in a tube of increased resistance to internal pressure without a consequent increase in the spring rate, thereby resulting in a Bourdon tube which is extremely useful for very small pressure gauges which must have a relatively high accuracy.

FIGS. 1, 5 and 6 show one type of pressure gauge in which the Bourdon tube of the invention can be utilized advantageously. Such a gauge includes a casing 23 having an opening in the front covered by a window 24 of plastic or glass, or the like. Into this casing is placed the gauge movement which includes an indicating dial 25, having suitable indicia thereon, behind the window 24. A pointer 26, operated by the gauge movement, lies between the window 24 and dial 25 and moves relative to the dial 25 to cooperate with the indicia thereon to indicate the pressure being measured. At the rear of the casing 23 is an opening 27.

The gauge movement includes a fluid pressure connection 28 which extends through opening 27 and rearwardly of the rear wall of casing 23. Connection 28 is connected to a line having the pressure being measured therein. A plate 29, carrying the gauge movement, is suitably connected to the rear wall of casing 23 so that the elements of the gauge movement are held in their proper relationship to each other and to the casing.

The pressure of the fluid in bore 30 in connection 28 is transmitted through bore 31, through bore 32 in tube 33 and into Bourdon tube 10 through the open end thereof. The pressure of the fluid inside of tube 10 causes the movement of the free tip thereof a distance related to the pressure being measured. The free tip or end of tube 10 bears against an abutment 34 on the short leg 35 of a bell crank 36 pivoted at 37. As shown in FIG. 5, as the pressure in tube 10 increases, the free end thereof moves upwardly against abutment 34 causing clockwise movement of bell crank 36. The long leg 38 of bell crank 36 has a flanged extension 39 at its end. An elongated slot 40 in extension 39 has a pin 41 passing therethrough. Pin 41 is attached to one end of a lever 42 secured at its other end to rotatable shaft 43. Pointer 26 is connected to shaft 43 for rotation therewith adjacent the front end thereof. As bell crank 36 is moved clockwise by tube 10, leg 38 and extension 39 are also moved clockwise, causing clockwise movement of lever 42, shaft 43 and pointer 26. The movement is so biased that when the pressure drops the parts will move in a counter-clockwise direction. Spring means 44 is arranged to contact abutment 45 on leg 35 so as to tend to turn the bell crank 36 in a counterclockwise direction. It is to be understood that the gauge illustrated in FIGS. 1, 5 and 6 is only one form of gauge in which the novel Bourdon tube of the invention can be utilized.

It is to be also understood that the described exemplary embodiment is merely intended for the purpose of illustration, and that the principles of the invention are not intended to be limited thereto, except as defined in the appended claims.

What is claimed is:

1. A pressure responsive element comprising an elongated flat tube haivng a plurality of spaced transversely extending embossments relieved at predetermined locations therealong to provide spaced points of minimum stress so that the actuating element will have maximum deflection without impairing its strength.

2. A pressure responsive actuating element comprising an elongated flat tube having a plurality of spaced transversely extending embossments on its flat sides, said embossments being relieved at predetermined locations therealong to provide spaced points of minimum stress so that the actuating element will have maximum deflection without impairing its strength, the flat sides of the tube being secured together intermittently between said transversely extending embossments along two transversely spaced longitudinal lines which are spaced from the side edges.

3. A pressure responsive actuating element comprising a pair of elongated strips having a plurality of spaced transversely extending embossments, said embossments being relieved at predetermined locations therealong to provide spaced points of minimum stress so that the actuating element will have maximum deflection without impairing its strength, said elongated strips being secured together along two transversely spaced longitudinal seams and being secured together intermittently between said transversely extending embossments along two laterally spaced longitudinal lines spaced from said seams.

4. A pressure responsive actuating element comprising a pair of elongated strips, each having a plurality of spaced transversely extending embossments and a continuous longitudinally extending embossment adjacent its center which is lower than said transversely extending embossments, said transversely extending embossments being relieved at predetermined locations therealong to provide spaced points of minimum stress so that the actuating element will have maximum deflection without impairing its strength, said elongated strips being secured together along two transversely spaced longitudinal seams and being secured together intermittently between said transversely extending embossments along two laterally spaced lines, said lines being between said seams and said longitudinal embossment.

5. A pressure responsive actuating element comprising a pair of elongated strips, each having a plurality of spaced transversely extending embossments and a continuous longitudinally extending embossment adjacent its center, said transversely extending embossments being relieved at predetermined locations therealong to provide spaced points of minimum stress so that the actuating element will have maximum deflection without impairing its strength, said elongated strips being secured together along two transversely spaced longitudinal seams and being secured together intermittently between said transversely extending embossments along two laterally spaced lines, said lines being between said seams and said longitudinal embossment.

References Cited in the file of this patent
UNITED STATES PATENTS

| | | |
|---|---|---|
| 500,830 | Winther | July 4, 1893 |
| 2,644,336 | Bowditch | July 7, 1953 |
| 2,712,240 | Booth | July 5, 1955 |

FOREIGN PATENTS

| | | |
|---|---|---|
| 6,965 | Great Britain | Aug. 2, 1887 |
| 838,657 | Germany | May 12, 1952 |